United States Patent [19]

Gastrock

[11] 4,216,796
[45] Aug. 12, 1980

[54] APPARATUS FOR INTERCONNECTING TANKS TO PREVENT OVERFLOWS AND SPILLS

[75] Inventor: Edward A. Gastrock, Metairie, La.

[73] Assignees: Charles L. Steward, Glencoe, Ill.; Gastrock Protein Corp., Metarie, La.

[21] Appl. No.: 960,094

[22] Filed: Nov. 13, 1978

Related U.S. Application Data

[62] Division of Ser. No. 721,203, Sep. 8, 1976, Pat. No. 4,139,646.

[51] Int. Cl.² ............................................. A23J 1/14
[52] U.S. Cl. .................................................... 137/571
[58] Field of Search ................... 137/577, 577.5, 571, 137/572, 574, 576; 209/211; 233/18

[56] References Cited

U.S. PATENT DOCUMENTS

| 3,486,619 | 12/1969 | Grundelius et al. | 209/211 |
| 3,559,811 | 2/1971 | Dahlberg | 209/211 X |
| 3,615,657 | 10/1971 | Gastrock et al. | 426/430 |

*Primary Examiner*—William R. Cline
*Attorney, Agent, or Firm*—Kinzer, Plyer, Dorn & McEachran

[57] ABSTRACT

An edible high-protein flour is produced by an improved process. Cottonseed meats are dried, and then comminuted in a combination of mills having certain specifications which prevent rupturing the pigment glands of the cottonseed. Recycling of partially ground meats is practiced. This improvement is correlated with liquid cyclone separation followed by oil and solids recovery steps, thus comprising an improved process which consistently yields an edible cottonseed protein concentrate and high grade cottonseed oil. An apparatus is disclosed for interconnecting tanks in an in-line liquid process for the purpose of minimizing spills and directing overflow from the tanks at the end of the process to the tanks at the beginning of the process. This apparatus includes a number of processing tanks located in proximity to one another. Overflow conduits are provided to sequentially connect one process tank to the other from the first tank to the last tank of the process. A dam is provided to control the flow through each overflow conduit between any two tanks. The effective heights of the dams are constructed so that they decrease in height from the last tank to the first tank in the process to direct the overflow from the last tank to the first tank in a cascading arrangement.

3 Claims, 5 Drawing Figures

Fig. 1.

APPARATUS FOR INTERCONNECTING TANKS TO PREVENT OVERFLOWS AND SPILLS

This is a division of application Ser. No. 721,203, filed Sept. 8, 1976, now U.S. Pat. No. 4,139,646.

SUMMARY OF THE INVENTION

This invention relates to an industrially practical, improved, continuous method of processing cottonseed to produce as a major end product an edible grade of cottonseed concentrate that is high in protein content and essentially free of gossypol, oil, and hulls. The said end product is eminently suitable for use as a high protein dietary supplement for human nutrition, and is of a quality and purity, with respect to its protein content, that have not hitherto been possible of attainment by contemporary processing methods.

BACKGROUND AND PRIOR ART

Cottonseed is unique among oilseeds in that distributed throughout the oil and protein bearing kernel are numerous small ovoid sacs, commonly known as pigment glands. These pigment glands contain about 35 percent to 45 percent by weight of gossypol and gossypol like compounds.

By chemical analysis, whole mill run cottonseed, with linters removed, contain up to about 1.5 percent of gossypol. Since the hulls contain little or no gossypol, the gossypol content of dehulled kernels is higher. If the protein content, only, of the cottonseed kernels is considered, its content of gossypol may be as high as 3 percent. This is an important consideration because as the protein content of any cottonseed product is increased by the removal of hulls, oil and other nonprotein constituents, the gossypol content will rise proportionally unless concurrent steps are taken to remove gossypol.

Gossypol is a highly reactive material, and under the processing conditions normally used including, but not limited to, moisture, heat, pressure and time, the pigment glands of cottonseed are ruptured, the gossypol is discharged and some or most of it combines with various constituents of the meal. The most usual combination appears to be with lysine, one of the essential amino acids present in cottonseed. When combined with gossypol, this essential amino acid is rendered nutritionally unavailable.

Two methods of gossypol anaylsis are presently in use and these methods permit the determination of gossypol with a high degree of accuracy. One method determines the "free" or uncombined gossypol content. The other method determines the "total" gossypol. The difference between the two values is referred to as the "bound" gossypol.

Cottonseed pigment glands normally are mechanically strong and resistant to rupture; however, in the presence of moisture, and particularly moisture in combination with heat and pressure, pigment glands readily rupture and discharge their gossypol content which material is thereby brought into intimate contact with the protein, oil and other constituents making up the kernel.

Currently, cottonseed is processed by mechanical pressing (screw pressing or hydraulic pressing), by solvent extraction with a commercial grade of n-hexane, or by prepress solvent extraction in which a major part of the oil is first removed by screw-pressing followed by solvent extraction of the resulting press cake with commercial n-hexane. The meal or cake produced by any of these processes is typically adjusted to contain 41 percent protein (nitrogen×6.25) by incorporation of cottonseed hulls that contain little or no protein. Some few commercial cottonseed crushing mills produce a meal with about 50 percent protein. The cake or meals just described (41 percent to 50 percent protein) are destined for use as animal feed. Processing conditions vary considerably in the different mills and can affect, in a significant manner, sometimes adversely, the quality and nutritive value of the cottonseed meal being produced, especially if use as a feed for nonruminants is intended.

The preparation and processing conditions employed in the aforementioned methods all employ in some degree the addition of moisture to either the kernels or the flaked meats, together with heating or cooking and the application of pressure where screw pressing, prepressing, or hydraulic pressing steps are employed. These conditions of processing are in general ideally suited to rupture the pigment glands, liberate the gossypol contained therein into initimate contact with the other kernel components, and promote the reaction of gossypol with the protein constituents of the kernel.

The presence of cottonseed pigments together with attendant processing conditions often cause the crude cottonseed oil produced conventionally to have a color so dark that the normal alkali refining and bleaching will not yield an oil prime in color. Such colored oils must be sold under a price penalty.

There was a limited commercial production of a cottonseed flour intended for human consumption. This was by careful selection of prime whole cottonseed kernels low in gossypol content from an adjacent production line (producing oil and feed grade meals), by the elimination of as many hulls as possible, by diversion of broken and fine kernel fractions (containing much hull material) back to the adjacent production line, and by careful screw pressing of the selected kernels, followed by fine grinding. By such processing, flour product was produced which was higher in quality than the conventional feed grade collaterally produced. The flour product was nevertheless much higher in total gossypol content, much lower in protein quality, and was much darker than the cottonseed flour produced by this invention.

Attempts have been made in recent years to develop processes which improve the quality and quantity of cottonseed protein concentrate obtained from cottonseed. U.S. Pat. No. 3,615,657, issued Oct. 26, 1971, in which I am a co-inventor, describes one such process for producing a high protein cottonseed concentrate free of gossypol and gossypollike compounds. The process taught in this patent includes the dry flaking of the cottonseed meats followed by the disintegration of a solvent slurry of the cottonseed flakes in a stone mill. The slurry from the stone mill is then diluted and the diluted slurry is screened, separated into coarse, intermediate and fine fractions with the fine fractions sent through one or more cyclone separators to separate the protein from the gossypol pigment glands.

A modification of the process taught in U.S. Pat. No. 3,615,657 is described in the November 1973 issue of Food Engineering, pgs. 124 to 131, and in the Journal of the American Oil Chemists' Society, Vol. 51, pgs. 153 to 157. In the modified process, several changes were made. For example, the steps of flaking the cottonseed meals followed by solvent milling in a stone mill were eliminated. Instead, the cottonseed kernels were comminuted in a sieveless, wide-chamber impact stud or pin mill. The modified process also used two two-stage liquid cyclones and two drum-type vacuum filters for separating high protein flour contained in the overflow slurry.

The process described herein is an improvement over the above processes.

THE PROCESS OF THE PRESENT INVENTION

The process of this invention will produce a high-grade protein concentrate, the quality of which will be evidenced by its representative anaylsis as follows:

| Composition: | |
| --- | --- |
| Moisture, % | up to 3.7 |
| Protein (Nitrogen × 6.25) MFB % | 65 or more |
| Nitrogen, % | 10.4 or more |
| Nitrogen solubility (in .02 N NaOH) % | up to 99 |
| Total gossypol, % | up to 0.18 |
| Free gossypol, % | up to 0.04 |
| Lipids, % | up to 1.0 |
| Crude fiber, % | 2.4 |
| Ash, % | 7.54 |
| E.A.F. Lysine (g./16 g N) | up to 3.94 |
| Residual Hexane (ppm) | up to 25 |

The above-listed compositional analysis is possible of achievement by reason of new discoveries that relate to the handling, preparation, and drying of the cottonseed kernels; by the discovery of new continuous techniques (refer to FIG. 1) in the application of equipment for selective and progressive comminution of the cottonseed kernels using initial dry pin milling followed by secondary milling in slurry form with recycling whereby the pigment glands are free essentially intact from their enrobing tissue, and the protein meal particles are finely comminuted without rupturing the pigment glands; by the discovery of a highly efficient, rapid and continuous solvent process using three 3-inch diameter liquid cyclones in series whereby a concentrated pigment gland fraction for diversion from the process is obtained as the underflow from the third 3-inch liquid cyclone, the overflow obtained from the first 3-inch liquid cyclone being employed directly to produce a product of 65 percent or higher by weight protein content and at a yield of 50 percent or higher based on the total solids fed to the first cyclone; by the discovery of a highly efficient continuous process whereby the coarse meal underflow fraction from the first cyclone is diluted with the overflow fraction from the third cyclone, the resulting slurry mixture is passed to a continuously operating screen (approximately 80 mesh), the slurry passing through the screen serving as feed to the second 3-inch cyclone and the coarse meal retained on the screen being returned to the in-line mixer receiving the comminuted feed from the pin mill and the mixed slurry from the in-line mixer being passed through a second comminuting device and diluted with overflow slurry from the second 3-inch cyclone, such diluted slurry serving as feed to the first cyclone, the overflow of which contains all of the purified fine cottonseed flour(50% or more of the solids fed to the process) which is the product of the process, after concentrating filtering and washing with hexane to remove oil; desolventizing and packaging. The underflow slurry from the third cyclone is pumped to a horizontal vacuum filter, drained and washed, if necessary, with commercial n-hexane, desolvenitized, cooled and packaged.

To prevent or minimize the concurrent rupture of pigment glands, it is essential first to dry the cottonseed kernel meats to a maximum of 2.5 percent by weight moisture.

The next step is one of the most important in the process. With insufficient size reduction, the yield of high-protein flour will be low; with excessively rough comminution, the pigment glands will be ruptured or overly fragmented thereby reducing the efficiency of the cyclone to separate them from the product flour. A sieveless, widechamber pin mill was found to be acceptable for the initial comminution step. The selected mill has two contra-rotating discs with rings of intermeshing round pins. The discs operate separately from the mill side and from the door. The proper degree of disintegration, with minimum gland rupture, can be accomplished if the mill side pin disc is operated at 9,500 RPM and the door side pin disc at 2,500 RPM. It is essential that the meats be dried to a maximum of 2.5 percent by weight of moisture content, and they should be unextracted prior to the comminution step.

The milled meats are next fed to an in-line mixer into which the oversize material from the 80 mesh screen is also fed, together with the necessary quantity of dilution hexane to yield a resulting slurry with a consistency of approximately 50 percent total solids.

I have discovered that it is highly beneficial to maintain the oil content of the cottonseed meats as high as practical in the comminuting steps. This is accomplished in the initial comminution step by using unextracted meats. In the second comminution step, it is accomplished by maintaining the oil content of the miscella associated with the slurry in the second comminution step at as high a value as is practical. To this end, the wash liquor from the vacuum drum filter and the mother liquor and wash liquor from the horizontal pan filter are returned to the dilution tank, mixed with commercial n-hexane as needed and used for dilution throughout the system where needed and as needed. The mother liquor from the vacuum drum filter contains all of the oil leaving the process. This mother liquor miscella is pumped to standard oil and solvent recovery equipment; the oil is pumped to tanks and the recovered hexane is returned to the process.

I have found that the under-flow from each cyclone as it progresses from the first cyclone to the third or last cyclone progressively contains a smaller and smaller proportion of purified fine flour. Thus, this fine flour gradually and eventually counter currently finds its way to the overflow of the first cyclone and is eventually recovered as part of the yield of purified fine flour from the process, thus exalting the yield.

Concurrently, the oil percent of the miscella associated with each underflow as it progresses from the first cyclone to the third or last cyclone becomes progressively lower so that eventually as the underflow from the third cyclone is pumped to the horizontal pan filter, the drained cake from the pan filter requires little or no washing with commercial n-hexane.

It may be found advantageous to use four or more cyclones in series rather than three cyclones. Such a changed flow could be easily accomplished. It is also obvious that two or more lines in parallel, each of which has three or more cyclones, could be used to multiply the capacity of the plant.

The slurry from the secondary comminution at about 50% total solids is diluted with the overflow from the second cyclone plus dilution hexane to a consistency of about 22% total solids and then pumped at a pressure of about 40 pounds per square inch into the tangential feed port of the first liquid cyclone at its largest diameter. The resulting centrifugal action whirls the feed stream around the periphery of the interior of the cyclone and exerts a centrifugal force of approximately 5000 times the force of gravity, depending on the pressure and rate of feed of the slurry material. This centrifugal action causes the larger, heavier, and more compact particles having the lowest ratio of surface area to mass (as typified by the ovoid-shaped pigment glands and the larger particles of meat tissue) to travel rapidly to the peripheral wall of the liquid cyclone. These particles which include essentially all of the pigment glands, the larger meats particles, and hull particles, are forced by the moving liquid down the tapered sides of the cyclone to the lower constrictive tip or "apex" of the cyclone where they are discharged, together with a minor portion of the solvent, as underflow. The finer meal particles or flour, which are essentially free of pigment glands and are of lower effective specific gravity and lower differential settling rate than the pigment glands and coarse meal particles due to their relatively high ratio of surface area to mass, move much more slowly towards the peripheral wall of the liquid cyclone and are forced upwards by the moving liquid through the vortex finder at the center of the cyclone and are discharged through the vortex finder at the top as overflow.

The underflow stream ranges in solids content from about 30 percent to about 45 percent by weight while the overflow stream ranges in solids content from about 10 percent to about 15 percent by weight, with the overflow stream amounting to from about 50 percent to about 90 percent and higher by weight of the feed stream, while the underflow stream amounts to from about 10 percent to about 50 percent of the weight of the feed stream. The ratio by weight of the overflow stream to that of the underflow stream and the solids content of the resepective streams is controlled by the rate and pressure at which the feed stream enters the tangential feed port of the liquid cyclone, the cross-sectional area of the "apex" orifice through which the underflow discharges, the makeup of the solids content of the feed stream with respect to particle size, and the solids content of the feed stream. The larger, and more compact particles of the slurry which include the bulk of the pigment glands, are forced by the moving liquid down the tapered sides of the "apex", or small lower end where they are discharged as underflow (UF). The finer meal particles, practically free of pigment glands, are forced to the center of the cyclone and are discharged upward through the vortex finder as the overflow (OF). The cyclone split or weight ratio of OF to UF is controlled by adjusting the speed of a positive displacement progressing cavity UF slurry pump which is located at the "apex" or UF opening of the cyclone. The "split" may also be controlled by varying the "apex" orifice. The "split" ratio is normally from approximately 1 to 1 to approximately 9 to 1. Under certain conditions, smaller or larger splits may be desirable.

Liquid cyclones are available in many sizes, usually designated by the maximum inside diameter of the cylindrical portion, expressed in inches (in.). The cyclone used in this invention is a 3 inch cyclone. This invention is not limited to the use of this size cyclone because other liquid cyclones, larger and smaller can be used.

It should be noted that the capacity of the system may be greatly expanded by the use of multiple lines of liquid cyclones in parallel.

The OF from the first liquid cyclone, having a solids content of about 14 percent is suitable as feed to a continuous vacuum drum filter. Filter runs on a small vacuum drum filter have yielded a rate of above 3.5 pounds of solids per square foot of filter area per hour. During filtration, it was observed that the filter cake had a tendency to crack which resulted in ineffective lipid removal. It was discovered that this problem could be solved by use of a feed slurry wash of the cake as it emerged from the slurry tank.

Commercial wiped film evaporators are available to concentrate the feed to the vacuum drum filter. Concentration of the feed to the vacuum drum filter would greatly reduce the size of the filter necessary for satisfactory operation.

A further advantage of increasing the feed to the filter would be a reduction in the tendency of ultra fine flour in the slurry feed to the filter to pass through the filter cloth thus reducing difficulties in the handling and processing of the mother liquor and wash liquor from the vacuum drum filter.

SALIENT FEATURES OF THE INVENTION

The salient features of the instant process are applicable to defatted, partially defatted, or undefatted cottonseed (which is preferred), glanded or glandless cottonseed, being prime in quality and free of deleterious contaminants as a starting material. The features comprise (1) rigorous control of moisture in the starting material (meats essentially free of hulls) at moisture levels well below those previously used in conventional oilseed milling practice; (2) precisely controlled gentle sequential comminution of the material being processed while maintaining the integrity of the gland structure to avoid dispersal of the gland contents in the processed material; (3) initial disintegration of the material by the use of a high-speed pin mill followed by secondary disintegration in slurry form; (4) the use of an 80 mesh screen principally to separate detached pigment glands from the slurry stream directed to the secondary disintegration step thereby reducing or eliminating the possibility of rupturing these pigment glands in the secondary disintegration step; (5) the use of three or more liquid cyclones operating in a counter circuit manner to separate the glands from the un-glanded portion.

Figure 1:
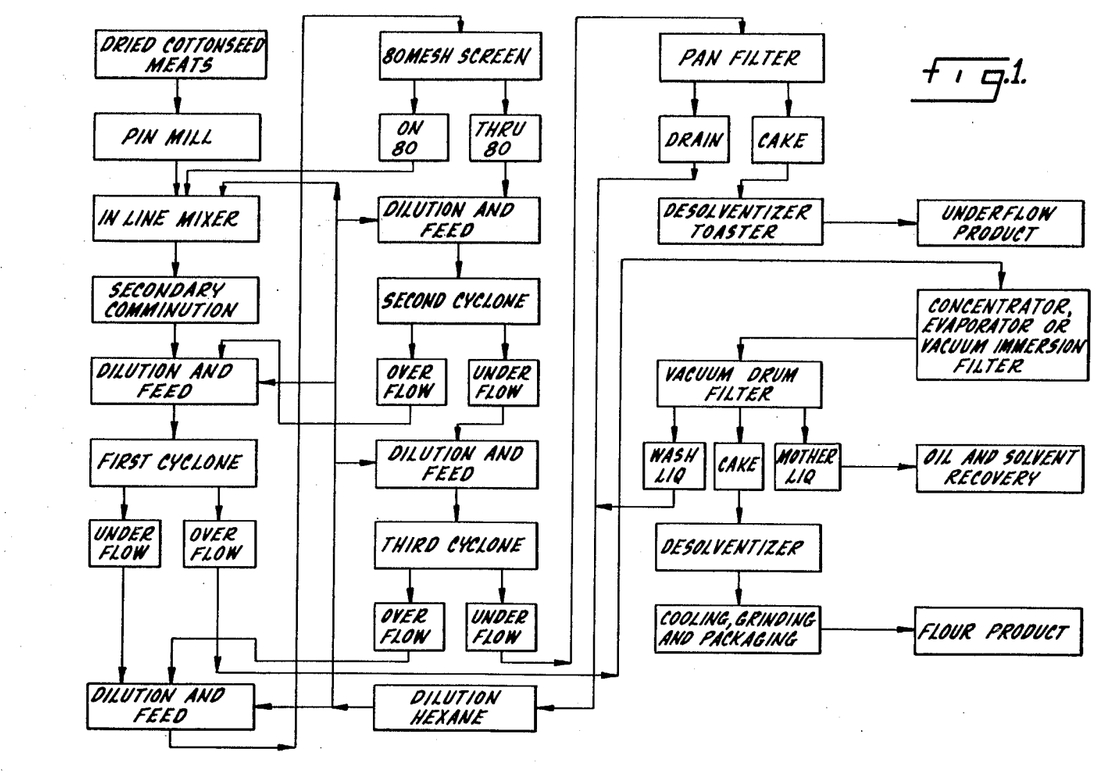
FIG. 1 is a flow sheet showing the process of my invention.

A more detailed description of the various steps of the process of the instant invention is provided. The steps are more easily related one to the other by recourse to the flow diagram (FIG. 1).

The process of the instant invention comprises the following steps wherein the cottonseed meats (kernels) are dried, comminuted sequentially in dry and slurry form with hexane and fractionated into a low gossypol content protein concentrate as overflow and a high gossypol content protein product as underflow. This overflow concentrate exhibits a protein content of 65% or more, by weight, at an overall recovery of 50% or more by weight, of initial solids fed to the liquid cyclone.

DRYING OF MEATS

Meats are dried preferably to 1.5–2.5 percent moisture content at a temperature not exceeding 180° F. The level to which the moisture content of the cottonseed meats should be reduced will vary in accordance with the moisture history of the cottonseeds used in the process. Seeds from cotton grown in relatively wet areas may require drying to a different moisture level than will seeds from cotton grown in relatively arid regions. The optimum moisture level for seeds of a particular variety or from a particular area may be determined experimentation. Drying meats prior to processing prevents the increase in moisture of the meats tissue resulting from removal of oil, i.e., meats at 8 percent initial moisture and 33.3 percent oil, when extracted "as is", would yield an oil free marc having a moisture content of about 12 percent. At this high level of moisture, pigment glands are weakened and ruptured simply by transfer of moisture to the gland walls. If the meats are dried to a moisture content of about 2 percent before extraction, the moisture content of the oil-free marc (on a solids basis) produced is only about 3.0 percent, a concentration insufficient to affect the pigment glands.

It also appears that drying the meats tends to toughen the pigment glands, to loosen the attachment of the pigment glands to the enrobing tissue of the meat and to make the proteinaceous material more friable during disintegration, especially in the initial comminution step.

INITIAL COMMINUTION OF MEATS

Comminution of the meats into ultrafine particles of meats tissue and intact pigment glands, most of which are entirely free of adhering meats particles, without rupturing the glands, is accomplished by first feeding the meats through a sieveless, wide-chamber pin mill. A mill found suitable has two contra-rotating discs about 11 inches in diameter with 3 rings of intermeshing pins of about ¼ inch diameter. The discs operate separately from the mill side and from the door at the rates of 9500 and 2500 r.p.m. respectively. Other disc speeds may be used. A vibratory feeder feeds meats into the mill where they are allowed to fall freely between the intermeshing pins whereupon they are disintegrated by impact. The grinding discs are suitably profiled so as to prevent the free passage of disintegrated meats at the pins' ends. The finely comminuted meats leaving the pin discs have a pronounced tendency to stick to the sides of a normal mill. This sticking and subsequent build-up pressure would result in body pigment gland and premature oil cell rupture producing a cottonseed butter. Such a condition results in the mill quickly clogging up and becoming inoperative. Once a majority of pigment glands are ruptured, they cannot be separated in a hexane, liquid cyclone process. To prevent this from occuring, the housing of the mill used in this process is of a wide-chamber construction, about 46 inches in diameter for example, which reduces the velocity of the particles in their travel to the housing walls preventing any significant build-up of finely disintegrated meats with inherent pigment gland rupture. Although the use of meats containing 1 percent or less hulls is preferred, the liquid cyclone can separate up to 3 percent hulls from disintegrated meats, but this larger hull percentage requires additional power for disintegration and more importantly, results in both increased gland rupture and lower protein concentrate recoveries. It is also necessary to prevent excessive build-up of heat during pin-milling. To accomplish this, meats must be cooled to approximately 120° F. before milling.

IN-LINE MIXING: DILUTION

In-line mixing is used to obtain uniform wetting of the comminuted meats by hexane and also to initiate oil extraction which results in further disintegration of meats tissue.

In-line mixing is accomplished by feeding comminuted meats, 80 mesh screen overflow and metered dilution hexane to a pug type, in-line baffled mixer which provides gentle rubbing agitation. Initially, dilution hexane is metered to the in-line mixer at a sufficient rate to produce a slurry containing 45 to 50 percent solids by weight. When "on stream" conditions are attained, the overflow from the 80 mesh screen is returned to the in-line mixer to provide the mixed slurry for secondary comminution and the metered hexane feed is correspondingly adjusted.

The uniformly mixed slurry is pumped directly from the in-line mixer into the stone mill or other unit selected for secondary comminution.

DILUTION - HEXANE

Dilution hexane is referred to several parts of the specification. It is composed of the wash liquor from the vacuum drum filter, all of the drains from the horizontal pan filter, plus regular or recovered n-hexane, as required. Careful calculations have shown that it will always be necessary to use a certain amount of regular n-hexane in addition to the wash liquor from the vacuum drum filter and all of the drains from the horizontal pan filter.

Accumulation of this dilution hexane is effected by directing the vacuum drum filter wash liquor and all of the horizontal pan filter drain to a tank to which regular n-hexane is added, controlled by a level control valve. The mixture is used ad lib where required. If, for any unforseen reason, the volume should become excessive, an overflow connection is provided to direct the excess to the oil and solvent recovery portion of the vacuum drum filter.

CLASSIFICATION BY LIQUID CYCLONES

The discharge from the secondary comminuting unit is diluted in the first cyclone feed tank which is maintained under sufficient agitation to keep all solids in uniform suspension and is fed to the first three inch diameter liquid cyclone at 35–45 p.s.i. pressure by a progressive cavity pump. Classification and separation of the suspended particles in the slurry takes place in the liquid cyclone to deliver an underflow and an overflow stream. The under-flow discharges from the lower tip, or "apex" of the liquid cyclone. The underflow amounts to between ten percent and fifty percent of the total slurry entering the feed aperture of the liquid cyclone and contains from about thirty percent to forty-five percent of solids. The overflow discharges from the upper, or the vortex finder outlet of the cyclone. This overflow stream amounts to from about fifty percent to about ninety percent of the total slurry entering the feed aperture of the cyclone and contains from about ten percent to fifteen percent of solids. The weight ratio of overflow to underflow is defined as the "split" and preferably ranges between from one part of overflow to one part of underflow to nine parts of overflow to one part of underflow.

The split ratio is controlled primarily by adjusting the speed of a positive displacement underflow slurry pump which is located at the apex opening of the cyclone. The solids contents of the overflow and underflow streams are also controlled by the split ratio and are affected by the percentage of solids in the feed stream and the degree of fineness of the solids.

The underflow contains essentially all of the intact and fractured pigment glands of the feed slurry, relatively coarse (but smaller than 80 mesh) particles of meats many of which contain embedded pigment glands and hull particles. These solids range from one percent to four percent in gossypol content and from forty-four precent to fifty-nine percent in protein.

SAMPLING PROCEDURES

Figure 2:
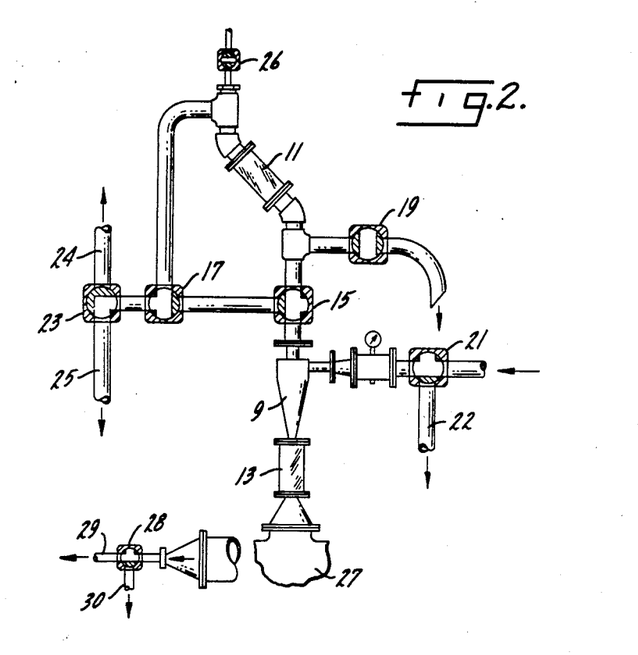
FIG. 2 is an elevational view of a sampling arrangement for the cyclone separators of my invention.

FIG. 2 of the drawings shows a piping arrangement that provides continuous visual examination of the overflow stream and the underflow stream from a liquid cyclone separator 9 of the type used in my process. Changes in the appearance and behaviour of these two streams as seen in overflow sight glass 11 and underflow sight glass 13 will signal to the operator a possible need for changing the operating feed, pressure, split, etc. on the run. In addition, the overflow sight glass 11 may be isolated from the system by suitably setting three-way valves 15 and 17. When this is done, a sample may be withdrawn from sight glass 11 for analysis or for any other purpose by opening valve 19 without disturbing the system. The piping is arranged so that sight glass 11 is inclined at 45° rather than vertical permitting the operator to observe the settling characteristics of the particles in the sight glass without withdrawing the samples.

Three-way valve 21 controls flow to the cyclone from the cyclone feed pump and can return the flow through pipe 22 to the feed tank. Two-way valve 23 controls overflow from the cyclone between overflow pipe 24 and feed tank return pipe 25. Valve 26 controls an air vent. Underflow pump 27 discharges through valve 28 which directs flow to either the underflow pipe 29 or feed tank return pipe 30.

This arrangement of piping is applicable to all of the cyclones of my process and provides for shifting of OF and UF streams between source and destination at start-up and in emergency situations and will provide continuous visual evidence of cyclone performances. This piping arrangement may be modified for slurry lines other than around the cyclones.

EIGHTY MESH SCREEN

The coarse meal underflow fraction from the first cyclone is diluted with the overflow fraction from the third cyclone, (see FIG. 1), the resulting slurry mixture is passed to a continuously operating screen (approximately 80 mesh) with the slurry passing through the screen serving as feed to the second three-inch cyclone and the coarse meal retained on the screen being returned to the in-line mixer receiving the comminuted feed from the pin mill. I have selected an eighty-mesh screen because it has been determined that 99.7% by weight of the separated pigment glands in a selected variety of cottonseed meats to be used in the process will pass through such a screen. If the particular cottonseed meats being processed are found to have pigment glands of a size which is different than the above, then a mesh of a different size should be selected to obtain approximately the same rate of passage of separated pigment glands. The mixed slurry from the in-line mixer is passed through a second comminuting device and diluted with overflow slurry from the second three-inch cyclone, such diluted slurry serving as feed to the first cyclone, the overflow of which contains all of the principal fine cottonseed flour (50% or more of the solids fed to the process) which is the principal product of the process, after concentrating, filtering, and washing with hexane to remove oil; desolventizing, cooling, and packaging.

The underflow slurry from the third cyclone is pumped to a horizontal pan vacuum filter, drained and washed, if necessary, with commercial hexane, desolventized, cooled and packaged.

SECONDARY GRINDING

I have found the critical step in the liquid cyclone process to be comminution or grinding. By this action, the proteinaceous material is separated from pigment glands and reduced in size to a condition that permits separation in the cylone. Uniform, finely divided protein particles may be easily separated in the overflow of a cyclone. Freed pigment glands and large protein agglomerates containing embedded pigment glands report to the underflow of the cyclone and unless recycled, are not a part of the process yield. It is highly desirable that freed pigment glands be removed from the abrasive portions of the process as soon as possible.

I have found many factors influence the comminution. The moisture content of the meats must be reduced to about 1.5% to 2.0% by drying. The drying temperature must not exceed 180° F.

I have found that every comminution step must be gentle so as not to rupture pigment glands. It is for this reason that primary and secondary comminution are practiced. For the same reason, the screening step is used. It was found for instance, that practically all separated pigment glands of at least one variety of cottonseed can be passed unruptured through an 80 mesh screen under somewhat dilute wet screening conditions. This led to the adoption of dilution and wet screening of the underflow from the first cyclone.

I discovered another important consideration to be the presence of oil during the comminution step. That is why I prefer unextracted (oily) meats in the process. Defatted (extracted) flakes used in early experiments were not as satisfactory as unextracted (oily) flakes. In addition, in the initial dilution steps, wash hexane from the drum and pan filters plus some hexane instead of pure hexane is used. Thus, all of the oil leaving the process is in the drum filter mother liquor plus a small oil content of the drum filter cake and the horizontal filter cake.

FILTERING

The overflow slurry from the first liquid cyclone, containing approximately fourteen percent edible high-protein solids, is recovered as a 35 to 40 percent solvent damp cake product from a totally enclosed rotary, vacuum, drum-type filter. During filtration, the cake, about 150 to ¼ inch thick, is given a hexane displacement wash which effectively reduces its lipid content to below one percent. The solvent to cake ratio is 1.75 to 1. While operating at this low solvent wash ratio, it was observed that the cake had a tendency to crack which resulted in channeling of the hexane wash and inefficient washing out of lipids. It was discovered that this tendency of the cake to crack could be overcome by the use of slurry-feed wash of the cake as it emerged from the slurry tank. The wash is located approximately at the periphery of the horizontal axis of the drum. The cake produced has a solvent content of about 60 to 65 percent.

An evaporator or a vacuum immersion filter may be substituted for the concentrator. These alternate means are shown in FIG. 1 of the drawings.

DESOLVENTIZATION

Desolventization is carried out in equipment designed to recover solvent with the use of heat. During desolventization, the temperature of the cake is allowed to rise to 200° F. in order to improve bacteria kill. Because of the low moisture content of the cake, this temperature has little to no effect on protein quality or product color.

The Desolventizer-Toaster handles the cake from the horizontal pan filter. It is standard in design and operation. The product is the high-gossypol, underflow meal from the process. It may be handled and shipped in bulk after desolventizing.

OIL AND SOLVENT RECOVERY

In order to protect the heating surfaces in evaporators and strippers, the miscella from the drum filter mother liquor (or any other source requiring evaporation) must be passed through a polishing filter of the Funda or Schenk type to remove any fine protein particles that may have passed into such miscella. Such fine particles would collect on the heating surfaces, fouling them, causing frequent shut downs for cleaning and to prevent discoloring of the oil product.

The Primary Miscella Evaporator and the Oil Stripper with auxiliaries are standard units and no special design feature appears to be called for. It should be emphasized, however, that adequate capacity must be provided in both units.

A Mineral Oil Absorber and Mineral Oil Scrubber with their auxiliaries are also needed for the vent system. No special design features appear to be needed.

GRINDING

After heat treatment as above, the cake is ground through a sanitary stud mill to a fine flour and packaged. The final, edible, product flour has a protein content on the order of 65 percent or higher and a free gossypol content of 0.045 percent or less.

Thus, after the 80 mesh screening step previously mentioned, the on-80 mesh fraction is returned to the "in line" (pugger) mixer in which a fairly high oil content is also maintained. The pugger mixture is then pumped to and through the secondary comminuting device and from thence, to the original dilution step as feed to the first cyclone.

The use of a three-cyclone line is also a factor tending to increase the yield of overflow flour. At each passage through one of the cyclones, the liquid portion of the slurry associated with the underflow has with it a certain percentage of fine flour such as would normally go to the overflow. When this overflow is diluted and pumped through the second and third cyclone, increasing amounts of this fine flour solids report to the overflow.

In the three-cyclone line, there is a counterflow of materials—the fine flour and oil moving in the overflow streams from the third cyclone through the second cyclone and to the first cyclone. On the other hand, the pigment glands, the hulls, and the partially comminuted meal particles move in the underflow stream from the first cyclone through the second cyclone to the third cyclone. Thus, increasing amounts of fine flour report to the first cyclone overflow and pigment glands, hulls and partially comminuted meal particles, reduced in oil content, report to the third cyclone underflow. Three things are accomplished: (a) as stated above, the yield of fine flour in the overflow is increased; (b) because of successive dilutions, the oil content of the underflow is significantly reduced; thus, (c) the need for washing of the oil from the cake on the pan filter is greatly reduced, if not eliminated.

PREVENTION OF SPILLS

In order to prevent spills in the process due to malfunctions of input pumps to the tanks or malfunctions of output pumps, each tank is provided with headspace above the working level of the tank. Additionally, the dilution and feed tanks for the first cyclone, the 80 mesh screen and the second and third cyclones are inter-connected by means of overflow dams so that in the event of overflow conditions, the overflow will cascade from the third cyclone dilution and feed tank to the second cyclone dilution and feed tank to the 80 mesh screen dilution and feed tank and then to the first cyclone dilution and feed tank. Thus, any overflow will result in the return of the material in process to the beginning of the processing cycle so that upon correction of the malfunction, the processing cycle may be resumed without the necessity of dumping of any tanks or transferring insufficiently processed material to the beginning of the processing cycle.

Figures 3, 4, 5:
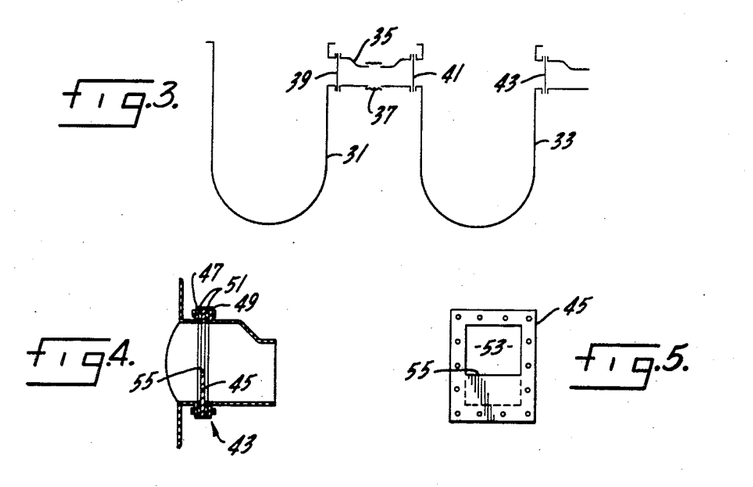
FIG. 3 is a partial cross-sectional diagrammatic view of a tank overflow system.
FIG. 4 is an enlarged, partial cross-sectional view of an overflow system dam.
FIG. 5 is an enlarged, elevational view of a dam frame.

FIGS. 3, 4 and 5 of the drawings show a typical overflow connection and dam between the dilution and feed tank 31 for the first cyclone and the dilution and feed tank 33 which supplies the 80 mesh screen. The overflow connection 35 between tanks 31 and 33 is formed of pipe of adequate diameter to handle any projected overflow. The overflow connection includes a flexible joint 37 between the tanks to reduce or eliminate the transmission of vibration from tank to tank. Located at the ends of the overflow connections adjacent each tank are dams 39, 41 and 43.

Dam 43, shown in enlarged detail in FIGS. 4 and 5 of the drawings, is typical of the dams and includes a rectangular frame member 45 which is connected between a rectangular flange fitting 47 on a tank and a rectangular flange fitting 49 of an overflow pipe. Gaskets 51 provide a seal between the flanges and the frame which are connected by threaded fasteners or other suitable connectors. A rectangular opening 53 is formed in the rectangular frame with the bottom edge 55 of the rectangular opening positioned above the bottom of the overflow pipe and tank opening. For dams at different locations, only the height of the bottom edge of the opening 53 of the frame 45 is varied to control the direction of cascading flow from tank to tank. In the process of this invention, the dam adjacent the third cyclone dilution and feed tank will have a rectangular frame with the highest bottom edge and the bottom edges of the frames will decrease in height with the frame of the dam 39 adjacent the first cyclone feed and dilution tank having the lowest bottom edge. Thus, flow will cascade from the tanks at the end of the process towards the tanks at the beginning of the process.

I claim:

1. Apparatus for interconnecting processing tanks in an in-line liquid process in which the material being processed moves from a tank at the beginning of the process to a tank at the end of the process, said interconnecting apparatus functioning to minimize spills and to direct spillage overflow from the tanks at the end of the process to the tanks at the beginning of the process with the apparatus including:

a plurality of processing tanks located in proximity to one another and connected by processing conduits, spillage conduits sequentially connecting one process tank to another with said spillage conduits connected to said tanks above the operating level of liquids in the tanks, at least one dam controlling flow through each spillage conduit between any two tanks, the effective height of each dam being above the operating level of liquid in the tank and at the level at which spillage of liquid from the tank will occur, the effective heights of the dam declining in height from the last tank to the first tank in the process to direct the spillage from tank to tank in a cascading arrangement and in a direction opposite to the movement of processing liquid from tank to tank.

2. The apparatus in claim 1 in which each dam includes a frame member, an opening is formed in said frame member and extends downwardly from near the top of the frame member to a lower edge, the lower edge of the opening defining the effective height of the dam.

3. The apparatus in claim 2 in which said frame member is rectangular and is located between the rectangular flange fitting on a tank and a rectangular flange fitting of a spillage conduit.

* * * * *

UNITED STATES PATENT AND TRADEMARK OFFICE
CERTIFICATE OF CORRECTION

PATENT NO. : 4,216,796
DATED : August 12, 1980
INVENTOR(S) : Edward A. Gastrock

It is certified that error appears in the above-identified patent and that said Letters Patent are hereby corrected as shown below:

1st page, [73] Assignees: first line, delete "Charles L. Steward" and insert --Charles L. Stewart--.

Signed and Sealed this

Twenty-sixth Day of May 1981

[SEAL]

Attest:

RENE D. TEGTMEYER

Attesting Officer

Acting Commissioner of Patents and Trademarks